(12) United States Patent
Yakasovic Saavedra (10) Patent No.: US 11,673,151 B2
(45) Date of Patent: Jun. 13, 2023

(54) LOW-WETTING ELECTROSTATIC APPLICATION DEVICE AND ASSOCIATED METHOD

(71) Applicant: INGEAGRO S.A., Quillota (CL)

(72) Inventor: Tomás Iván Yakasovic Saavedra, Limache (CL)

(73) Assignee: INGEAGRO S.A., Quillota (CL)

( * ) Notice: Subject to any disclaimer, the term of this patent is extended or adjusted under 35 U.S.C. 154(b) by 464 days.

(21) Appl. No.: 16/968,103

(22) PCT Filed: Feb. 1, 2019

(86) PCT No.: PCT/CL2019/050008
§ 371 (c)(1),
(2) Date: Aug. 6, 2020

(87) PCT Pub. No.: WO2019/153100
PCT Pub. Date: Aug. 15, 2019

(65) Prior Publication Data
US 2021/0023575 A1 Jan. 28, 2021

(30) Foreign Application Priority Data

Feb. 6, 2018 (CL) .................................. 0341-2018

(51) Int. Cl.
*B05B 5/03* (2006.01)
*B05B 1/24* (2006.01)
(Continued)

(52) U.S. Cl.
CPC .................. *B05B 5/03* (2013.01); *B05B 1/24* (2013.01); *B05B 5/001* (2013.01); *B05B 5/0533* (2013.01);
(Continued)

(58) Field of Classification Search
CPC ......... B05B 5/03; B05B 5/001; B05B 5/0533; B05B 5/087; B05B 1/24
(Continued)

(56) References Cited

U.S. PATENT DOCUMENTS 4,798,341 A * 1/1989 Gimple ................ B25J 19/0029
239/290
4,971,818 A 11/1990 Pye
(Continued)

FOREIGN PATENT DOCUMENTS

EP 2620728 A1 7/2013
WO 2007009474 A1 1/2007

OTHER PUBLICATIONS

International Search Report and Written Opinion dated May 3, 2019, directed to International Application No. PCT/CL2019/050008; 16 pages.

*Primary Examiner* — Joseph A Greenlund
(74) *Attorney, Agent, or Firm* — Morrison & Foerster LLP (57) ABSTRACT

An electrostatic device that includes: an air flow regulator system including a pressure regulator and an air flow regulator; a liquid flow regulating system including a set of restrictors; an electrostatic system including an electrostatic emission antenna and an insulating hood of the electrostatic emission antenna; an air-liquid nozzle that is separated from the electrostatic emission antenna; a tank; a positive displacement pump and a low-wetting electrostatic application method.

23 Claims, 6 Drawing Sheets

(51) Int. Cl.
  *B05B 5/00*       (2006.01)
  *B05B 5/08*       (2006.01)
  *B05B 5/053*      (2006.01)
  *A23B 7/16*           (2006.01)
  *A23L 3/34*           (2006.01)

(52) U.S. Cl.
  CPC . *A23B 7/16* (2013.01); *A23L 3/34* (2013.01); *A23V 2002/00* (2013.01)

(58) Field of Classification Search
  USPC .......................................... 239/706; 427/458
  See application file for complete search history.

(56) References Cited

U.S. PATENT DOCUMENTS

| | | | | |
|---|---|---|---|---|
| 5,171,613 | A * | 12/1992 | Bok | B29B 7/94 118/667 |
| 5,197,676 | A * | 3/1993 | Konieczynski | B05B 5/1675 239/690 |
| 5,271,569 | A * | 12/1993 | Konieczynski | B05B 5/1675 239/3 |
| 6,021,965 | A * | 2/2000 | Hartle | B05B 5/001 138/120 |
| 6,105,886 | A * | 8/2000 | Hollstein | B05B 3/1064 239/105 |
| 6,460,787 | B1 * | 10/2002 | Hartle | B05B 7/1263 239/691 |
| 7,083,115 | B2 * | 8/2006 | Huffman | B05B 7/1673 239/135 |
| 8,123,147 | B2 * | 2/2012 | Fulkerson | B05B 1/34 239/296 |
| 8,191,805 | B2 | 6/2012 | Nakada et al. | |
| 8,317,113 | B2 | 11/2012 | Uegaki et al. | |
| 8,827,191 | B2 * | 9/2014 | Mather | B05B 7/1459 239/708 |
| 9,511,478 | B2 * | 12/2016 | Li | B05B 5/087 |
| 2005/0229845 | A1 * | 10/2005 | Mather | B05B 5/032 118/308 |
| 2008/0006726 | A1 * | 1/2008 | Ohno | B05B 5/03 239/706 |
| 2009/0032625 | A1 * | 2/2009 | Yamada | B05B 5/04 239/690 |
| 2009/0127357 | A1 | 5/2009 | Suda et al. | |
| 2011/0262650 | A1 * | 10/2011 | Lee | C23C 16/4486 427/457 |
| 2015/0126097 | A1 * | 5/2015 | Li | B05B 7/10 451/450 |
| 2015/0190823 | A1 * | 7/2015 | Mather | B05B 7/1486 239/707 |
| 2016/0074885 | A1 * | 3/2016 | Prus | B05B 5/087 239/703 |
| 2017/0119213 | A1 * | 5/2017 | Newman | A47J 43/07 |
| 2017/0291181 | A1 * | 10/2017 | Wright | B05B 5/03 |
| 2018/0280998 | A1 * | 10/2018 | Jackson | B05B 5/03 |
| 2018/0311688 | A1 * | 11/2018 | Fulkerson | B05B 7/1463 |
| 2020/0072774 | A1 * | 3/2020 | Li | G01N 25/20 |
| 2020/0282411 | A1 * | 9/2020 | Li | B05B 7/0483 |
| 2020/0370158 | A1 * | 11/2020 | Birmingham | B01J 13/02 |
| 2021/0023575 | A1 * | 1/2021 | Yakasovic Saavedra | B05B 12/085 |
| 2021/0379611 | A1 * | 12/2021 | Liu | B05B 7/0892 |

* cited by examiner

LOW-WETTING ELECTROSTATIC APPLICATION DEVICE AND ASSOCIATED METHOD

CROSS-REFERENCE TO RELATED APPLICATIONS

This application is a U.S. national stage application under USC § 371 of International Application No. PCT/CL2019/050008, filed on Feb. 1, 2019, which claims priority of Chilean Application No. 0341-2018, filed on Feb. 6, 2018, the entire contents of each priority application are incorporated herein by reference.

FIELD OF THE DISCLOSURE

The invention relates to a device comprising an electrostatic application system that operates with ultra-low volume and allows the application of liquid or gaseous products, or mixtures thereof, for the post-harvest treatment of fruits or vegetables before packaging, in the process lines of packing facilities or orchards. The device delivers drops of a few microns in diameter and the adherence of the microdroplets is achieved through the application of an electrostatic charge, achieving optimum coverage of the product applied to the treated surface. The electrostatic device that allows the control of the amount of product applied, allows to decrease the amount of product used, reaching a low wetting "dry effect" application. In addition, the device allows working at different ambient temperatures, delivering precise amounts of the applied product, which is deposited by loading effect on the surfaces treated in a very homogeneous way.

The invention also relates to a dry effect application method, that is, the treated surface does not show evidence of the application within a few seconds of the electrostatic application because of the small size of the microdroplets applied and the homogeneity of the application as a result of the electric charge that is induced to each one of the microdroplets, avoiding the superposition of the same and thus the accumulation of product in a specific point. Not adding water on the treated surface decreases the incidence of fungus growth since humidity is one of the vectors that influence their growth and the probability of fungal attack decreases when humidity is not present. In addition, an anti-dehydrating protective agent may be deposited during the application.

BACKGROUND OF THE DISCLOSURE

During the storage and transportation of fruits or vegetables for export, decomposition and dehydration generate enormous economic losses. Fruit or vegetable exporters are looking for alternatives to store treated products in good condition for periods of more than 30 days in order to avoid such economic losses.

Various devices for the application of chemical or phytosanitary agents to the harvested fruit can be found in the prior art to prevent disease in the fruit. The amount of chemicals used to wet the fruit is excessive and requires it to be subsequently placed in drying chambers.

WO 2007009474 discloses an application method of phytosanitary products onto post-harvest fruit under controlled conditions by electrostatic spraying. However, the method requires a hood that collects excess spray solution that has not settled on the fruit.

EP 2620728, U.S. Pat. Nos. 8,191,805 and 8,317,113 relate to electrostatic devices for controlling ambient humidity by freezing it and subsequently melting the water in the atomizing device by means of a heat transfer device.

U.S. Pat. No. 4,971,818 relates to a method for spraying a harvested crop using a rotary-type electrostatic sprayer comprising: moving the crop along a conveying line, surrounding and covering a region of said belt with electrodes formed by lead wires from 100 to 150 meters that extend rolled in thirty turns that cover the application area of the spraying device.

The application system of equipment operating in chambers at a temperature below 0° C. encounter a problem, specifically in the nozzle through which the product exits. The reason is that the liquid that passes through the nozzle freezes when exposed to the compressed air that atomizes it, whose temperature is 2 degrees (−2 degrees) lower when the air expands, clogging up the nozzle and preventing the application. The nozzle clogs up when frozen and prevents the passage of liquid.

In the prior art, the most commonly used technique to prevent the development of diseases in the fruit for export is the use of $SO_2$ generators, which includes a stage of rapid release of $SO_2$ and a stage of slow release of $SO_2$, within each of the boxes containing the fruit during the packaging and transport process.

SUMMARY OF THE DISCLOSURE

In some embodiments, the devices and methods described herein makes it possible to keep fruit or vegetable for export in good condition for a period of 45 to 90 days or more, avoiding the development of diseases and reducing their dehydration during the storage and transportation period, allowing exporters to plan exports with a broader time frame, and thus obtain greater commercial profitability.

In some embodiments, application of an ultra-low volume of the solution avoids having to collect an excess thereof and, in turn, to treat the contaminating residues described in the prior art.

In some embodiments, moisture or wetting the treated surface of the fruits or vegetables may be avoided in order to keep them in good condition during storage and transport.

In some embodiments, the device includes an electrode with a simplified structure, easy to install at the packing site and which manages to control the amount of product applied and allows it to work at different ambient temperatures.

To solve the problem of a nozzle clogging up when frozen and preventing the passage of liquid, in some embodiments, a device for post-harvest treatment that allows working at different temperatures, including temperatures below 0 degrees Celsius. To achieve application at low temperatures, the device includes a heating element for the nozzle. This heating element allows the nozzle to be kept at a temperature higher than room temperature, preventing the product passing through it from freezing and clogging it. The device also comprises a tank heating system in which the product to be applied is stored, which prevents the product to be applied from freezing when passing through the tubes or hoses before reaching the nozzle.

In some embodiments, a device for post-harvest treatment before packaging, which comprises a flow control system for the liquid and/or gaseous products that are applied. It allows the application of precise amounts of liquids of different densities and of different pHs, and allows to work at an application temperature ranging from −5 degrees to 50 degrees Celsius, thus maintaining a constant application flow.

In some of the embodiments, the device allows the application of liquid and/or gaseous products after harvest and, specifically, allows the application of an ultra-low volume of different chemical, organic or ecological products to meet different production standards in chambers that operate at low temperatures. It also allows regulating and controlling the amount of product applied without wetting the treated surface, achieving a thy effect and avoiding the application of excess water. This makes it possible to avoid the humidity that is the favorable environment for growth and development of fungi and undesirable microorganisms. In some embodiments, the device achieves a dry effect, that is, it has a minimum wetting capacity in the range from 0.3 $cm^3$ to 10 $cm^3$ per square meter, so that the surface treated by the device of the invention is surprisingly dry within a few seconds of the application, and this avoids an additional drying step of the treated surface.

In some embodiments, the device makes it possible to deliver a homogeneous application of the product that can even reach the surface of the fruits or vegetables at the bottom of a box or container. In addition, it allows the applied product to adhere to the surface of the fruits or vegetables in hard-to-reach places such as, for example, the points of inflorescence and even the fruit stalks that other devices are unable to cover.

In some embodiments, the electrostatic device may be versatile in that it allows the application of different products. For example, in some embodiments, the electrostatic device may be adapted for the application of gases, such as ozone, to sanitize the packing site.

In some embodiments, the device may also be used to apply fungicides or disinfectants to the packaging materials of the fruit, such as cardboard or plastic boxes, or the paper used to separate the fruits inside a box.

For example, it is possible to apply products to blueberries packed in Punnets or Clamshells. This is because the critical point of rot is where the fruit is in contact with the container. A fruit is wounded where there is a point of friction, but if the container is sanitized with a fungicide coating, the possibility of rot decreases. According to some embodiments, this is made possible with the device because it allows a dry effect application, that is, with a minimum application of water, so that the properties of the materials on which the product is applied are not altered since it does not add excess water to the surface.

In addition, the device allows the application of mixtures of products that include covers to the surface of fruits or vegetables. The covers allow maintaining the organoleptic characteristics and avoid dehydration or weight loss during storage or transport. For example, it allows the application of wax to apples, the application of organic products to meet industry standards, the application of edible toppings, beeswax, synthetic waxes, sugars, cinnamon or propolis extract.

In some embodiments, the application system of the device allows to determine precisely the amount of product to be applied per application area and surface treated.

The invention will be described in detail below, with reference to the accompanying drawings, which illustrate embodiments of the invention.

BRIEF DESCRIPTION OF THE FIGURES

FIG. 1 shows a schematic representation of the electrostatic device, according to some embodiments.

FIG. 2 shows a schematic representation of the liquid flow regulation system.

FIG. 3 shows the application system with each of its components comprising the nozzle and the heater.

FIG. 4 shows a view of the application system.

FIG. 5 shows an elevation view of the insulating hood.

FIG. 6 shows a cross section of the insulating hood.

DETAILED DESCRIPTION OF EXEMPLARY EMBODIMENTS

In some embodiments, an electrostatic device comprising: an air flow regulator system including a pressure regulator (12) and an air flow regulator (13); a liquid flow regulating system (35) comprising a set of restrictors (26); an electrostatic system comprising an electrostatic emission antenna (7) and an insulating hood (9) for the electrostatic emission antenna; an air-liquid nozzle (6) that is separated from the electrostatic emission antenna (7); a tank (5); and a positive displacement pump (4).

In some embodiments, the electrostatic device for post-harvest treatment comprises an electrostatic emission antenna, an insulating hood, a flow rate control system or liquid flow regulator (through nozzles or flow restrictors), a pressure regulator, an air flow regulator, a positive displacement booster pump, a pond, an air-liquid nozzle. Likewise, the device includes a temperature control system (of the tank and nozzle) to work in different environments and at different temperatures, wherein the equipment is adapted to work at low temperatures in chambers that operate at temperatures below 0° C. or even −2° C.

In some embodiments, an electrostatic application method comprises providing an air flow to an insulating hood (9) of an electrostatic emission antenna (7) and to an air-liquid nozzle (6) that is separated from the electrostatic emission antenna (7); providing a liquid flow from a tank (5) to the air-liquid nozzle (6) by means of a positive displacement pump (4); regulating the air flow by means of a pressure regulator (12) and an air flow regulator (13); regulating the liquid flow (35) that passes through a set of restrictors (26); and turning on the power directed to the electrostatic emission antenna (7).

Control Console

The equipment comprises a control console (2) that allows central control of the equipment. The console comprises an on/off control, an electrostatic generator system control, a pump power source control, a control for remote or manual control, and may further comprise a control of the air flow regulators at the nozzle and a liquid flow regulator control.

The control console includes a power light that indicates that the equipment is connected to the electrical network; an on/off switch that turns the equipment on or off; a remote control or manual control switch that activates the use of the command console or the use of the remote control (3); a pump switch that activates the pump (4) allowing the arrival of liquid from the tank (5) to the application nozzle (6); an electrostatic switch that activates the electrostatic power directed to the electrostatic emission antenna (7); it may also comprise a switch that activates the power directed to the nozzle heater and the tank heater.

A high voltage power line (8) comes from the control console (2), goes to the electrostatic emission antenna (7) and passes through the hood (9) before reaching the electrostatic emission antenna. The hood (9) fulfills the function of isolating the high voltage power line (between 5,000 to more than 30,000 volts) by means of an air flow that surrounds the high voltage power line going from the hood to the electrostatic emission antenna.

Figure 1:
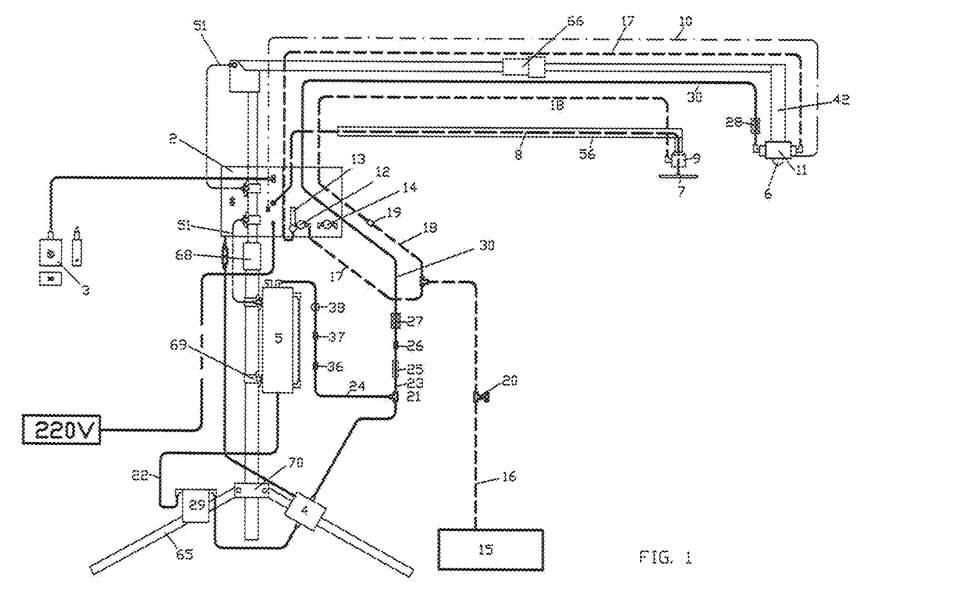

A power line (10) also comes from the control console (2) and is directed to the heater (11) of the nozzle (6). See FIG. 1.

Air Flow Regulator

According to some embodiments, to regulate the air flow coming out of the nozzle, the equipment comprises an air flow regulator system that includes a pressure regulator (12) and an air flow regulator (13). The air flow regulator (13) comprises a flow rate meter that comprises a small steel ball in a graduated column, where the steel ball is pushed by the air flow.

Compressed air is supplied by a compressor (15). An air line (16) exits from the compressor and branches into two air lines: a first air line (17) that carries air to the nozzle, and a second air line (18) that carries air from the electrostatic emission antenna (7) to the insulating hood (9). See FIG. 1.

According to some embodiments, it is important that the compressed air going to the insulating hood be dry air, so that the air keeps an area of the hood dry in order to isolate the high voltage power line (from 5,000 to more than 30,000 volts) directed to the electrostatic emission antenna, in order to avoid electrical conduction between the electrostatic emission system and the other elements of the device, and thus avoid the formation of an electric arc and burning the high-voltage power cables. In the absence of this dry air flow coming out of the hood, the same product that is applied by the nozzle would contaminate the hood, generating a conductive bridge between the electrostatic antenna and the structure of the equipment that is connected to ground for electrical protection.

The first air line (17) that carries air to the nozzle passes through the control console (2) where it meets a pressure regulator (12) and an air flow regulator (13), which allows the air flow to be regulated going to the nozzle. The second air line (18) that carries air to the insulating hood (9) has a restrictor (19) that controls the amount of air that goes to the insulating hood. See FIG. 1.

According to some embodiments, the device comprises a pressure regulator (12) that allows to regulate the droplet size indirectly by controlling the air pressure. The air pressure can be varied, for example, between 1 to 2 bar (100 to 200 KPa) to control the size of the droplet that exits from the nozzle.

By regulating the air flow, the droplet size can be regulated, where the droplet size is inversely proportional to the applied air flow. In general, an air flow can be measured by pressure difference, whereby an air flow can be approximately calculated. However, according to some embodiments, device comprises a gas flowmeter that directly measures the flow. In some embodiments, directly measuring the air flow is important in the device because the droplet size is controlled by the air flow. The droplet size required in the application depends on the ambient temperature. At a higher ambient temperature, a larger droplet size should be used in order to prevent the droplet from evaporating before reaching the surface to be treated, that is, on the way from the nozzle to the target surface. The path can be, for example, between approximately 20 cm to 200 cm.

Furthermore, in some embodiments, a flowmeter may be implemented in the device to regulate the air flow directed to the nozzle. By regulating the air flow directed to the nozzle, the droplet size can be regulated more precisely. The flowmeter regulates the air flow from 0 to 25 liters of air per minute on the principle that the greater the air flow, the smaller the droplet size.

In addition, controlling the droplet size that depends on the amount of air going to the nozzle allows regulating the amount of product to be applied.

For example, when 1 bar (100 KPa) of pressure is applied, the droplet size is very large and the treated fruit remains wet a few seconds after the application. The pressure is then increased, which increases the air flow rate, thereby reducing the droplet size and increasing the liquid flow rate, which increases the liquid flow that passes through the restrictors across the binary control system or decreases the amount of return to the tank to maintain the liquid flow rate at this new air flow.

Flow Rate Control and Liquid Flow Regulator

The electronic flow rate meters of the state of the art are not suitable for measuring low flows in the equipment of the invention, so a mass flowmeter was sought.

In some embodiments, the electrostatic device comprises a flow regulating system for the liquid products that are applied. The flow regulator system allows the use of liquid products of different densities, different pHs, or a mixture of products, and allows working at temperatures from −5 to 50 degrees Celsius, maintaining a constant flow of product that exits from the nozzle.

Flow regulators in the prior art had problems working at temperatures below 5° C. A flow regulating system (35) had to be implemented in the device, which is shown in FIG. 2.

In some embodiments, the liquid flow regulating system (35) comprises the use of in-line nozzles or a set of restrictors (26), a binary switch system (40) that allows opening or closing the restrictors (31, 32, 33, 34) through solenoid valves (41), and a return flow measurement system comprising a regulating valve (36), a flow control (37) and a flowmeter (38). So that the flow regulating system (35) regulates the flow rate and allows to deliver predetermined and measured quantities of product through the nozzle of the device, according to some embodiments.

Figure 2:
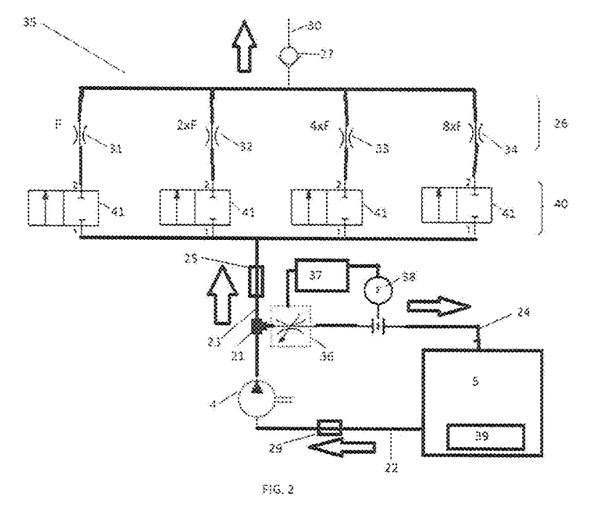

The flow regulating system (35) of FIG. 2 shows that the liquid exits the tank (5) through a first liquid line (22) and passes through a filter (29). The liquid is driven by the positive displacement pump (4) to a fork (21), where it separates into: a second liquid line (23) and a return liquid line (24). The second liquid line (23) comprises a line filter (25) and a set of restrictors (26) that regulate the amount of liquid that goes to the nozzle. The return liquid line (24) is returned to the tank. The return line (24) comprises a regulating valve (36), a flow control (37) and a flowmeter (38) that measures the liquid flow that is returned to the tank (5). In the return liquid line (24) the liquid flow is much higher, approximately 2 liters per minute, which allows the amount of return liquid to be measured accurately and, at the same time, allows the contents of the tank to be stirred with the liquid returning to the tank.

After passing through the set of restrictors (26), the second liquid line (23) encounters a first check valve (27) that prevents the liquid from returning to the restrictors so that the liquid flow that it is directed to the nozzle through the third liquid line (30) is maintained measured and constant.

The device comprises a line filter (25) that goes from the fork (21) to the set of restrictors (26) prevents the restrictors from being clogged up in the second liquid line. The device also comprises a second check valve (28) that is located just before the nozzle (6) to prevent liquid from returning from the nozzle.

The flow regulating system (35) comprises a set of restrictors (26) comprising restrictors (31, 32, 33, 34) of different thickness. The restrictors (31, 32, 33, 34) are located in the second line of liquid that goes from the pump to the application system. The restrictors (31, 32, 33, 34) have different internal diameters ranging from approximately 0.3 mm to 1 mm in diameter.

For example, the set of restrictors (26) comprises a 1×F restrictor (31) (a given unit flow), a second 2×F restrictor (32) (twice a given flow), a third 4×F restrictor (33) (four times a given flow), a fourth 8×F restrictor (34) (eight times a given flow). The amount of liquid that goes to the spray nozzle (6) can be regulated with the opening and closing of the restrictors (31, 32, 33, 34) through the solenoid valves (41) by means of a binary system.

In one embodiment of the device, the return flow measurement system in the flow regulating system (35) can be replaced by a set of return restrictors with a larger internal diameter ranging from approximately 1 mm to 5 mm in diameter. Therefore, the amount of return liquid could be regulated manually by changing the diameter of a return restrictor or with a set of larger diameter return restrictors that could be interchanged in order to regulate the liquid that is returned to the tank through the return line (24). In this embodiment, the device comprises a set of flow restrictors that are interchangeable and are used depending on the amount of product to be applied. For example, there could be a set of 8 restrictors, 4 application restrictors, and 4 return restrictors. Restrictors can be interchanged to achieve the proper flow of application.

In some embodiments, the liquid flow regulating system (35) allows regulating the flow more precisely, avoiding the manual exchange of restrictor in the device. This prevents having to stop the operation of the equipment and the conveying line in order to rig the device to carry out an exchange of restrictors and recalibrate the equipment.

In some embodiments, the flow regulating system allows flow rate control, for example, from 0 to 250 cm$^3$/min, from 0 to 150 cm$^3$/min, from 0 to 50 cm$^3$/min, preferably from 10 to 20 cm$^3$/min, more preferably 15 cm$^3$/min.

Nozzle

Figure 3:
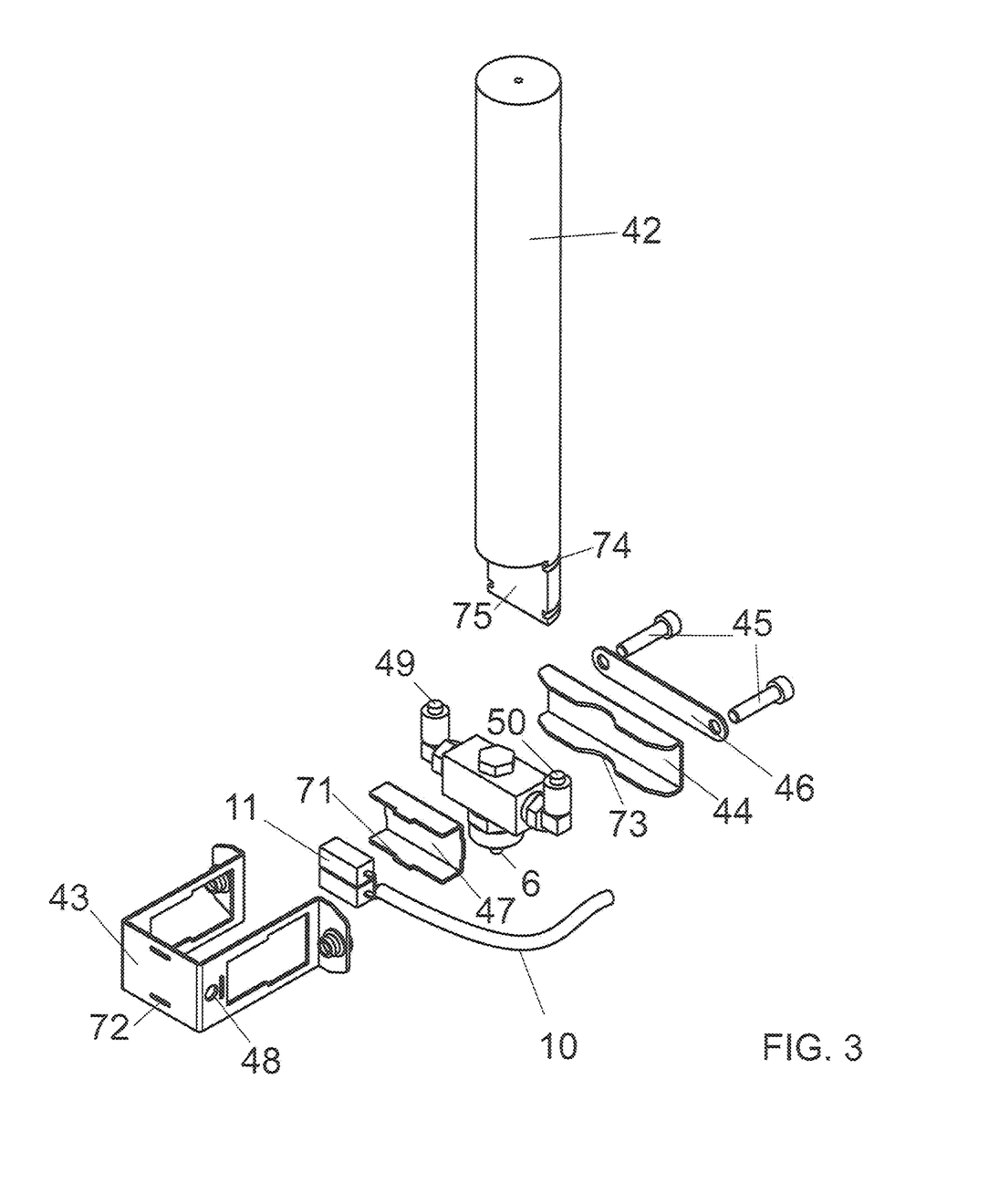

FIG. 3 shows the application system of the electrostatic device, comprising an air-liquid spray nozzle (6), according to some embodiments. The nozzle (6) is made of stainless steel, with a flat fan, which allows to generate droplets of variable size. The air-liquid nozzle allows the atomization of the product to be applied. The nozzle comprises a liquid inlet (49) that receives the liquid that comes from the third liquid line (30) and an air inlet (50) that receives the air that comes from the first air line (17).

The nozzle (6) is attached to a flat surface (75) located at the lower end of a nozzle holding tube (42). The nozzle is housed in the space formed between a nozzle holder (43) and the flat surface (75). The nozzle holder (43) forms a rectangular frame with an open end, the open end comprises fastening tabs (76) that include threaded holes into which bolts (45) are screwed to secure a nozzle cap (44). The nozzle cap (44) has a flat shape and has two perpendicular surfaces that comprise a recess (73) so that it can be inserted into an anchoring slit (74) located at the rear of the lower end of the nozzle holding tube (42).

The nozzle holder (43) houses a nozzle heater (11) which is supported by a heater cover (47). The heater cover (47) is made of heat conductive material, has a flat shape and has two perpendicular surfaces that have an anchoring protrusion (71). The anchoring protrusion (71) is inserted into an anchor hole (72) of the nozzle holder (43) to hold the nozzle heater in place. The nozzle holder (43) has a power line hole (48) for the entry of the power line to the heater.

An anchor plate (46) closes the rectangular frame of the nozzle holder (43) by means of bolts (45) that are inserted into holes located at the ends of the anchor plate (46). The holes in the anchor plate (46) match the threaded holes located in the holding tabs (76) of the nozzle holder (43). The bolts pass through the holes in the anchor plate (46) and push the nozzle cap (44) which is inserted into the slots (74) to hold the nozzle and heater in place. See FIG. 3.

Figure 4:
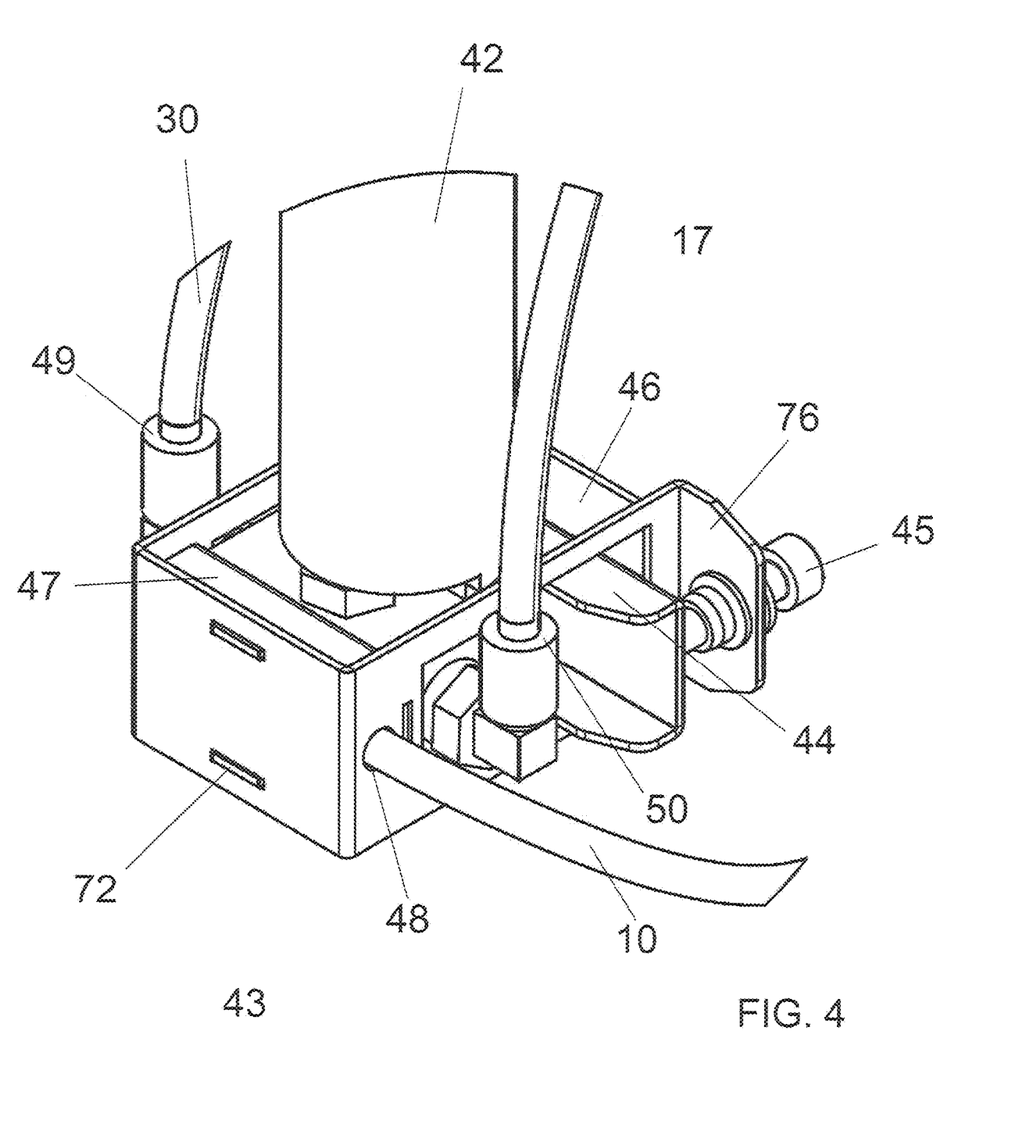

FIG. 4 shows the assembled application system where the nozzle heater is closely fitted to the heater cover (47), which, in turn, is closely fitted to a flat surface of the nozzle, so that the heater is in contact with the nozzle cap and nozzle surfaces and the heater can heat the nozzle by contact.

Temperature Effect

The temperature control system allows to work independently of the ambient temperature, and allows the device to become independent from the properties of the product or composition applied and from the environmental conditions of the treatment site.

When working in refrigerated environments, the liquid can freeze in the nozzle which clogs up the lines and renders the nozzle inoperable. To avoid this problem, a heating system was chosen using a nozzle heater and a tank heater that can start operating when the ambient temperature requires it.

In some embodiments, the present invention comprises a heater at the nozzle (11) due to the need to work at temperatures below 2° C. or close to 0° C. or below zero, such as −5° C. At low temperature, the product that is applied can freeze when exposed to the compressed air that atomizes it, whose temperature is less than 2 degrees, (−2 degrees) when the air expands, sealing the nozzle causing the nozzle to clog up and preventing an application.

When the volume to be applied is low, that is, between 5 to 15 $cm^3$ per minute, a nozzle heater is required. If the application volume is greater, for example, from 20 to 160 $cm^3$ per minute, then a heater for the tank where the liquid to be applied is kept is also required.

The heating element of the nozzle comprises an electric resistance, for example, equipped with two electric resistors of 5 watts each. The heating element comprises a heater cover (47), an electrical resistance and a heater power line (10) electrically connected to the electrical resistance located inside the heater cover (47).

Voltage

The problem of applying more than 1,200 volts, for example, arises because the applied product is a conductive product comprising, for example, water, salts and an active product, and can generate an arc. The arc can produce a spark that can lead to the burning of the hoses that carry the product to the nozzle. When an arc occurs, the effect of the electrostatic field is nullified, causing the charged particles that are applied to the target surface to separate.

Some devices of the prior art that work at approximately 1,000 volts, for example, do not allow application more than 30 cm away from the surface to be treated because a recharge of the particles occurs, that is, the particles lose the charge effect. As a result, the electrostatic effect is lost and the atomized particles lose the ability to adhere to the surface.

The device applies a voltage greater than 15,000 volts. For example, the device for the treatment of cherries uses approximately 15,000 volts and the device for blueberries operates at approximately 30,000 volts, which is much higher than the voltage applied by most of the equipment described in the prior art.

Electrostatic devices in which the electrostatic emission component is a component of the nozzle are also described in the prior art. Instead, in the device, electrostatic stimulation is applied remotely from the nozzle, according to some embodiments.

In some embodiments, the device comprises a nozzle (6) that is independent and is separated from the emission antenna that generates the electrostatic field. For example, the nozzle (6) and the electrostatic emission antenna (7) can be at a distance of between 5 to 30 cm from each other.

If a higher voltage is applied, the number of charged particles increases. The device charges both liquid particles and air particles that come out of the nozzle.

As the applied voltage increases, the number of charged particles increases and the charge of the particles increases, thus increasing the application distance and increasing the coverage of the treated surface to achieve a long-range electrostatic system.

In some embodiments, the device allows to apply even inorganic products such as copper or silicon that are highly conductive, because the device has an insulating hood (6).

Furthermore, according to some embodiments, the device makes it possible to avoid the electric arc by regulating the distance between the electrostatic emission antenna and the atomization nozzle (6). This allows to apply highly conductive inorganic products and avoid electric arc, by increasing the distance between the high voltage electrostatic emission antenna and the nozzle (6).

Furthermore, in some embodiments, the device comprises two ground cables (51). A ground cable runs from the nozzle holder to the control console (2). A second ground cable runs from the tank (5) to the control console (2). See FIG. 1.

Tank

In some embodiments, the device further comprises a tank (5) containing the liquid to be applied, which has a pumping system and a temperature control system.

The tank, made of stainless steel, has from 5 to 60 liters capacity, preferably from 10 to 50 liters capacity, for example, 15 or 13 liters capacity, and comprises a stirring system. The stirring system comprises three pumps arranged at the base of the tank. The tank also includes a temperature control system that allows the product to be kept at a suitable temperature to prevent the liquid from freezing in the hoses when the ambient temperature is below 0° C.

The tank may be made of PVC, however stainless steel is more preferable. The size of the tank depends on the amount of product to apply. Smaller tanks are often used with more concentrated products so that they also require stirring to maintain a homogeneous concentration of the liquid inside the tank.

It is important to keep stirring the contents of the tank. For example, a 10-liter tank is also stirred by the movement of the liquid that returns to the tank. A 60-liter tank, for example, requires stirring by 3 pumps located symmetrically at 120 degrees at the base of the tank. Additional stirring occurs by suctioning the center of the tank to the periphery to prevent the product from decanting inside the tank.

Pumping System

The equipment includes a pumping system that includes an acid-proof positive displacement pump (4) that drives the product to be applied to the nozzle (6), returning 90% of its flow to the tank to keep the product stirred and homogeneous.

Pump

The positive displacement pump (4) drives the liquid from the bottom of the tank (5) to the nozzle (6). The pump is activated from the control console (2) and can be powered by an electric motor. The booster pump has a 12-volt electrical connection that connects it to the control console.

The booster pump also pumps liquid to the top of the tank through a return line (24). The return line (24) generates circulation of the liquid inside the tank. The first liquid line (22) that comes from the tank (5) passes through a filter (29) that prevents the pump from becoming contaminated or clogged.

In some embodiments, the pumps used by the device are diaphragm pumps; gear pumps can also be used. The use of diaphragm pumps is preferred because gear pumps often leak.

According to some embodiments, the diaphragm pump (4) is a positive displacement pump, operating at up to 70 pounds of pressure, preferably between 20 to 40 pounds of pressure. The pressure increase is carried out by the push of elastic membranes or diaphragms, which allow the volume of the chamber to be increased or decreased by controlling the movement of the fluid from the area of lesser pressure to the area of higher pressure.

In some embodiments, the diaphragm pump (4) offers certain advantages over other types of pumps, since they do not have mechanical seals or gaskets that are the main causes of breakdown of pumping equipment in severe conditions. Maintenance of the pump is quick and easy and has easy-to-replace components. The diaphragm pump allows working at different temperatures, is resistant to corrosion and is widely used in the industry for the movement of practically any liquid.

The pumps stir the product and allow the liquid coming from the tank from a first liquid line (22) to rise to the nozzle (6). The hoses that come out of the pump (4) branch to form a return liquid line (24) that goes from the pump to the tank (5) and another hose to form a second liquid line (23) that goes from the pump to the application nozzle (6).

The equipment also includes regulating valves. The function of the regulating valves is to keep constant the flow of air and liquid that is supplied to the air-liquid nozzle. The user controls the regulation depending on the amount of product that needs to be applied to the target surface.

Electrostatic System

The electrostatic system comprises an electrostatic emission antenna (7), a protective and insulating hood (9), a tube for the high-voltage conductor element (56) that carries the high voltage power line (8) and supports that secure the tube of the high voltage conductor element (56) to a horizontal part of the nozzle holding tube (42).

The electrostatic emission antenna (7) is responsible for generating the electrostatic field that allows the separation of the particles of the product that is applied to the target surface. The electrostatic emission antenna (7) is activated from the control console. The insulating hood (9) prevents the formation of electric arcs to the device structure.

Hood

In some embodiments, the electrostatic device comprises an antenna that generates an electrostatic field, which is located at the bottom of a hood (9). The hood (9) isolates the electrostatic emission antenna (7) from the rest of the components of the device.

Figure 5:
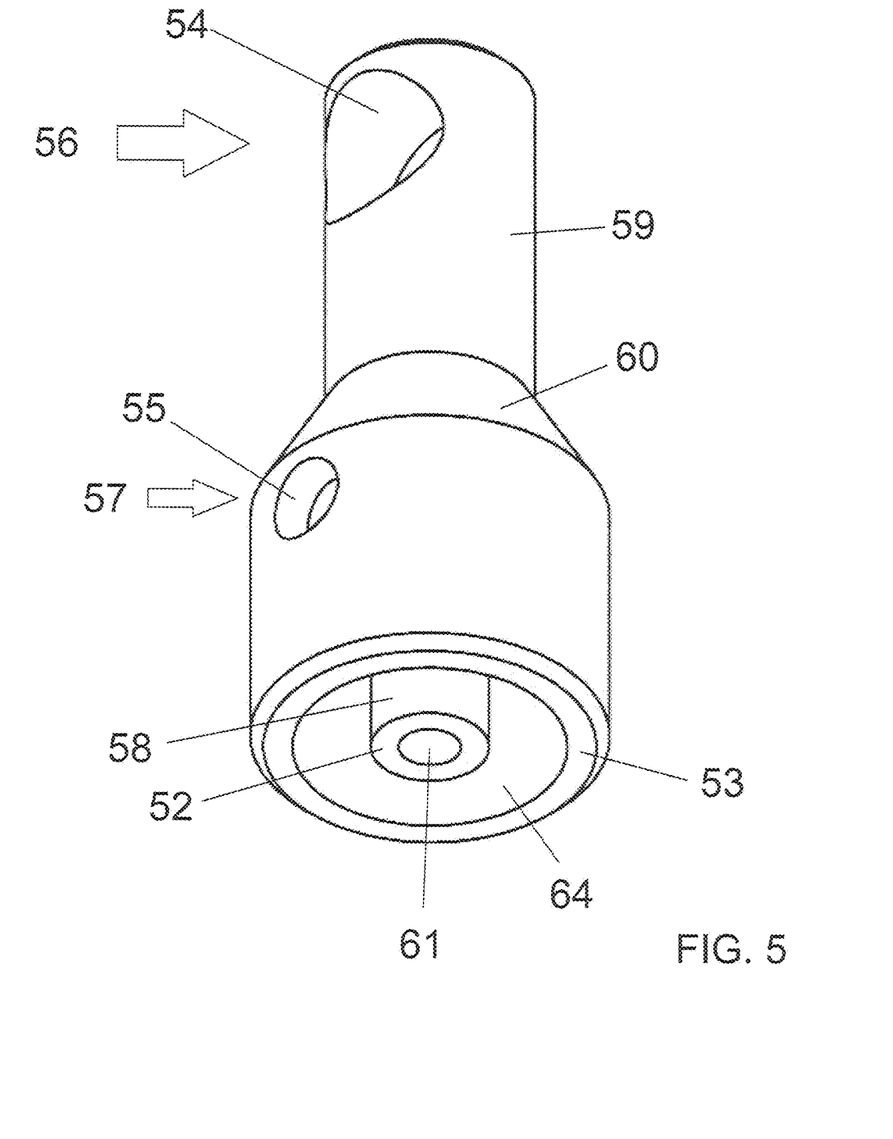

The hood (9) is shown in FIG. 5. The hood (9) comprises an internal tube (52) and an external tube (53), an upper hole (54) for the entry of the high voltage conductive element (56) and a lower lateral hole (55) for the entry of dry air (57) that acts as an insulator. The high voltage conductive element (56) enters through the upper hole (54) and exits through a lower hole (61) of the internal tube (52).

The internal tube (52) allows the cable of the high-voltage conductor element (56) that goes to the electrostatic emission antenna (7) to come out in a position equidistant from the outer wall (63) of the external tube (53) of the hood. Maintaining a distance between the electrostatic emission antenna (7) and the lower edge of the outer surface of the external tube (53) of the hood is critical to avoid the formation of an electric arc. When working at more than 15,000 volts, it is sometimes necessary to increase the distance between the electrostatic emission antenna (7) and the lower edge of the outer surface of the external tube (53). If necessary, the distance between the electrostatic emission antenna (7) and the hood may be increased, for example, by lengthening the cable of the high-voltage conductor element (56), or by using a hood with the external tube (53) having a larger diameter.

The hood (9) comprises a lower lateral hole (55) through which enters a hose that injects dry air (57) in the form of an air jet between an external tube (53) and an internal tube (52) of the hood (9). The air jet forms an air chamber that keeps the area formed between the external tube (53) and the internal tube (52) dry. The air jet dries the outer surface of the inner tube (58), that is, the air jet dries the area formed around the central space through which the high-voltage conductive element (56), that goes to the electrostatic emission antenna (7), exits. The air prevents the surface around the space from where the high-voltage conductive element (56) exits from getting wet and prevents the formation of an electric arc that produces a spark, so that the air chamber formed in the area between the external tube (53) and the internal tube (52) prevents the effect of the electrostatic field of the device, which separates the particles, from being nullified by the action of an electric spark or a flame.

Figure 6:
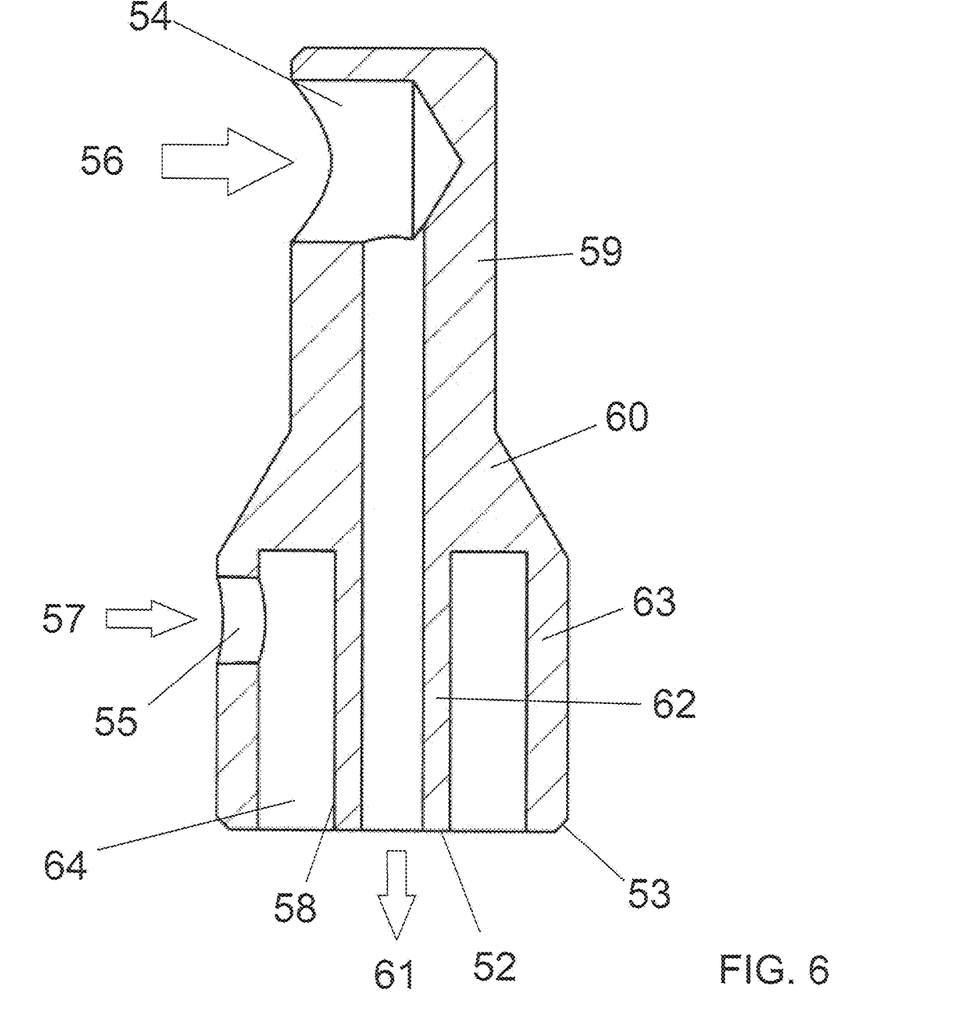

FIG. 6 shows a cross-section of the hood (9) comprising an upper tube (59) that has an upper hole (54) through which the high voltage power line (8) enters. The high voltage power line (8) that carries the high voltage conductive element (56) passes inside the internal tube (52), exits through the lower hole (61) and goes to the electrostatic emission antenna (7). The diameter of the upper tube (59) of the hood is greater in the middle part (60) to form a truncated hollow double-wall cone having a lower wall (62) and an outer wall (63). The outer wall (63) forms the external tube (53) and comprises a lower lateral hole (55) through which the second air line (18) enters, bringing dry air (57) to the space formed between the inner wall (62) and the outer wall (63). The dry air (57) forms an air chamber (64) by injecting a jet of dry air that comes from the second air line (18) that enters through the lower lateral hole (55) of the hood (9).

The hood is made of machinable, non-conductive plastic material resistant to acidic chemical. The material must be of high wear resistance and high abrasion resistance. The hood material may be of ultra-high molecular weight and high-density polyethylene, such as Robalon. Alternatively, the material of the hood can be Teflon or Technyl. Technyl is a polyamide with thermoplastic characteristics that has good resistance to chemical agents and is easy to machine, has great mechanical resistance, and excellent wear resistance.

In some embodiments, the device further comprises other optional components including a remote control, an aluminum mounting stand that allows mounting on all types of process lines, a general holding tripod and a dome.

Remote Control

In some embodiments, equipment also includes a remote control (3) that includes a system for remotely starting and stopping the equipment to automate the application. The remote control (3) is connected to the control console (3) or may be wireless.

The remote control allows starting or stopping the application from more than 15 meters away. In order for the remote control to be activated, the "Remote Control" switch must be selected in the control console. When the "Remote Control" switch is on, the remote control replaces the operation of the switches of the pump and electrostatic system in the control box.

Stand

In some embodiments, the device can be installed in any part of the packing line on a stand (65) that is very little invasive. in its lower part. The lower part of the stand is a tripod comprising a folding fastening element (70) and a main column (67) provided with an attachment (68) that allows adjusting the height of the main column (67). The main column (67) also includes clamps (69) that allow to secure the tank, the filter and the pump to the stand. Furthermore, according to some embodiments, the device allows the position of the nozzle (6) and the electrostatic system to be regulated by means of a regulator (66) that allows the length of the horizontal part of the nozzle holding tube (42) to be adjusted. Adjusting the length of the horizontal part of the nozzle holding tube (42) is important because the nozzle must be at half the width of the packing area to achieve a uniform application.

The device can be automatically synchronized with the packaging line so that if the packaging line stops, the device stops working to avoid over-wetting of the application area.

Dome

A dome can be used to protect the application area of the product. The dome prevents drafts produced in the packing area, often by internal fans, from interfering with the application of the products to the treated surfaces.

The dome may be installed at the application site to avoid "drift", which is the movement of the particles away from their target, that is, to avoid all those applications that do not reach the target surface and that constitute a loss of product, and can generate undesired effects in the environment around or near the application site. Drift can occur during application, especially when spraying small-sized droplets electrostatically charged with volatile product, or when an air current is generated in the packing area.

Drift can also occur at the lower edges of the dome. To avoid drift, an air curtain may be applied to the lower edge of the dome. To this end, the device may optionally include an additional pressure regulator (14) that controls the air flow applied to a tube provided with holes that form an air curtain at the bottom of the dome and prevents product droplets from escaping from the application site.

Calculation of the Dose to Apply

According to some embodiments, to calculate the amount of product or mixture to be applied with the device, it must be determined how much product or mixture must be added to 1 liter of water to obtain the recommended dose for application to the fruit.

The packing lines operate at a constant speed, so that a place on the line is selected to install the device.

The width A of the packing line is measured, a length L is determined to define the application area and the time T in seconds that the fruit takes to travel the distance L is calculated. Therefore, the speed of line VL is equal to L/T.

$V_A$ is the velocity of the area in square centimeters that passes under the dome per second:

$$V_A = L \times A / T [\text{cm}^2/\text{s}]$$

The following formula is used to determine the amount of product that must be added to 1000 cm³ to achieve the proper dosage delivered by the device.

The amount of product to be added to 1000 cm³ is calculated using the following formula:

$$\text{Product amount} = 60{,}000 \times D \times A \times L / 10000 \times C \times T - 60 D \times A \times C.$$

Where A is the width, L is the length of the application area, T is the time it takes for the product to travel through the application area, C is the flow rate of the nozzle and D is the final dose to be applied to the target surface in cm³ per m².

To calibrate the equipment, the flow rate is calculated by measuring the volume per minute delivered by the device. A container such as a beaker can be used to hold and measure the volume of liquid delivered by the nozzle within a given time.

Step 1

How many seconds it takes for 1 [$m^2$] to pass under the dome must be determined.

$$\text{If } A\times L/T[cm^2/s] \text{ - - - } 1\ [s] \text{ and}$$

$$10{,}000\ [cm^2] \text{ - - - } X\ [s],$$

$$X=10^4\ [cm^2]\times[s]\times T/A\times L[cm^2]=10^4\ T\ [s]/A\times L.$$

Therefore, 1 [$m^2$] passes under the dome in $10^4$ T [s]/A×L.

Step 2

How many [$cm^3$] of the mixture are applied to 1 [$m^2$] must be determined.

Let C=flow rate of the nozzle per minute.

Therefore, q=C/60=flow rate of the nozzle per second.

The volume of mix that is applied to 1 [$m^2$] is:

$$C/60\ [cm^3/s]\times10^4\ T\ [s]/A\times L=10^4T\times C/60A\times L[cm^3].$$

D being the dose of product to apply per [$m^2$], it can be established that:

$$\text{The water per } [m^2] \text{ is } (10^4T\times C/60A\times L)-D, \text{ and}$$

$$\text{the product per } [m^2]=D.$$

Therefore, the rule of three to obtain the dosage in 1000 [$cm^3$] of water is:

$$[10^4T\times C/60A\times L-D] \text{ - - - } D,$$

$$1000 \text{ - - - } X,$$

$$\text{and where } X=1000\ D/[(10^4T\times C-D60A\times L)/60A\times L],$$

$$X=60{,}000\ D\times A\times L/[10^4T\times C-D60\times A\times L]\ [cm^3],$$

where X is the [$cm^3$] of product that must be added to 1000 [$cm^3$] of water in order to deposit D [$cm^3$] of product per treated [$m^2$] of conveying line.

In some embodiments, the invention also relates to an electrostatic application method because it comprises the steps of providing an air flow to an insulating hood (9) of an electrostatic emission antenna (7) and to an air-liquid nozzle (6) that is separated from the electrostatic emission antenna (7), providing a liquid flow from a tank (5) to the air-liquid nozzle (6) by means of a positive displacement pump (4); regulating the air flow by means of a pressure regulator (12) and an air flow regulator (13); regulating the liquid flow (35) that passes through a set of restrictors (26); and turning on the power going to the electrostatic emission antenna (7).

Wherein the method further comprises connecting the power of a temperature control system which includes connecting the power of a nozzle heater (11) and the power of a tank heater.

In some embodiments, the electrostatic application method comprises powering a nozzle heater (11) which is supported by a heater cover (47); wherein the heater cover (47) is made of heat conducting material, wherein the nozzle heater (11) and the heater cover (47) are tightly connected, the latter being in turn tightly fitted to a flat surface of the nozzle so that the nozzle heater (11) can heat the nozzle by contact.

Wherein the step of providing a dry air flow going to the insulating hood (9) of an electrostatic emission antenna (7) of the electrostatic application method, according to some embodiments, comprises forming an air jet between an external tube (53) and an internal tube (52) of the hood (9), which dries the area formed around the central space through which the high-voltage conductive element (56), that goes to the electrostatic emission antenna (7), exits; the air jet prevents the surface around the space where the high voltage conductive element (56) exits from getting wet and prevents the formation of an electric arc that can produce an electric spark or a flame that can nullify the effect of the electrostatic field on the device. Wherein the step of providing a dry air flow going to the insulating hood (9) of an electrostatic emission antenna (7) comprises forming an air jet between an external tube (53) and an internal tube (52) of the hood (9), which dries the area formed around the central space through which the high-voltage conductive element (56), that goes to the electrostatic emission antenna (7), exits; the air jet prevents the surface around the space where the high voltage conductive element (56) exits to get wet and prevents the formation of an electric arc that could produce an electrical spark or a flame that could nullify the effect of the electrostatic field on the device.

Wherein the step of regulating the liquid flow that goes to the nozzle (6) of the electrostatic application method, according to some embodiments, is carried out by means of a binary switch system (40) that includes solenoid valves (41) that regulate the amount of liquid that passes through a set of restrictors (26); that includes opening or closing the solenoid valves (41) to regulate the amount of liquid that passes through restrictors (31, 32, 33, 34) that have different internal diameters ranging from approximately 0.3 mm to 1 mm.

Wherein the step of regulating the flow of a return line (24) of the electrostatic application method is carried out by means of a regulating valve (36), a flow control (37) and a flowmeter (38) that measures the liquid flow that is returned to the tank (5), according to some embodiments; wherein the liquid flow in the return liquid line (24) is greater, by approximately 2 liters per minute, which allows to accurately measure the amount of return liquid and at the same time allows to stir the contents of the tank with the liquid that returns to the tank.

Wherein the step of regulating the air flow of the electrostatic application method is carried out by means of a pressure regulator (12) and an air flow regulator (13), wherein the air flow regulator (13) comprises a flowmeter provided with a steel ball in a graduated column, wherein the steel ball is pushed by the flow of compressed air that is supplied by a compressor (15), according to some embodiments; wherein dry air exits from the compressor through an air line (16) that branches into two air lines: a first air line

(17) that carries air to the nozzle, and a second air line (18) that carries air to the insulating hood (9) of the electrostatic emission antenna (7).

Wherein the step of regulating the air flow of the electrostatic application method, comprises regulating the pressure of the first air line (17) that carries air to the nozzle by means of a pressure regulator (12) and an air flow regulator (13) on the control console (2), according to some embodiments; wherein regulating the air flow allows to regulate the droplet size coming out of the nozzle, where the droplet size is inversely proportional to the applied air flow.

Examples of Application on Blueberries

In general, antifungal products to treat the fruit are not applied post-harvest, especially in blueberries because when applying the antifungal products, water is added to the fruit, and wetting the fruit before packing is a problem.

In some embodiments, the device allows this problem to be overcome by the application of post-harvest antifungal products, especially in blueberries, because the device prevents wetting the fruit before packaging. In some embodiments, electrostatic device allows a dry effect application that has the advantage of not altering the characteristics of the fruit cuticle, such as the bloom, a natural wax that covers the fruit and does not wet it, thus avoiding a drying step after application.

Application of 1 $cm^3$/cubic meter to 10 kilos of blueberries. Working from 0 to 5° C. evaporates less and requires greater control of the droplet size given that the evaporation of the product is minimal on the surface of the blueberries at temperatures between −5° C. to 5° C.

For example, a product to be applied to blueberries can be Nature Cover by DECCO.

By controlling the droplet size, a product drying step is avoided. Using a smaller droplet size results in the surface of the fruit being less wet and the packing line being less contaminated.

The electrostatic device is installed in the pre-calibrator area of the blueberries. The height of the main commune must be adjusted through the clamp (69) and the length regulator of the nozzle holder (66) must also be adjusted so that it is at an average distance in the width of the conveyor line, so that the application system is at a suitable height and position in the application area.

Example of Application on Cherries

In the post-harvest treatment, the cherries are carried in water to avoid damage to the fruit and to avoid pitting. The transport water of the cherries contains a fungicide. After use, the water and the fungicide are eliminated causing contamination and economic losses.

In some embodiments, the device replaces the fungicide used in the cherry transport water by an electrostatic application of post-harvest fungicide product at the exit of each of the production lines.

In some embodiments, applying a fungicide to cherries with the equipment avoids applying large amounts of fungicide in the water that transports the cherries, and therefore avoids economic losses and the contamination that occurs when eliminating the water mixed with fungicide that is used in the process chain.

In one embodiment of the device for application on cherries, the equipment is of the portable type. The application on cherries is micronized, the required droplet size is smaller. 15,000 volts are used and the temperature must be controlled.

In some embodiments, the electrostatic device may be refitted for the application on cherries in that it is separated into, on the one hand, the stand comprising the pump, tank and the control console and, on the other hand, the nozzle and the electrostatic generator system that can be installed in the dome, so that one equipment can be installed for each cherry packing line.

The device for applying a fungicide product to cherries can be located in the fruit drop area to achieve a radial application of the fungicide product, covering the entire surface of the fruit. Application in the drop area is carried out on cherries and nuts.

Moreover, given that the green petiole must be maintained in cherries, silicon or edible toppings (for example, cinnamon, propolis) are applied thereon. In addition, a fungicide product (such as Scholar® or PROBION®) may be applied.

Application on plums, where wetting is carried out at a rate of 8 cm3/meter2, is another example of application. When working in packing areas at room temperature, for example from 10 to 25° C., evaporation is greater and it is easier and faster to obtain dry fruit after application.

Another example of application that can be mentioned is that of Scholar's fungicide in addition to wax on apples.

Examples of Treatment Agent or Products

The treatment agent or products are selected from chemicals, organic products, waxes or gases, among which are products that have properties as phytosanitary agents, fungicides, anti-dehydrants and disinfectants. For example, a chemical agent with protective activity intended to prolong the preservation of fruits or vegetables. The chemical agent comprises, for example, a liquid or gas, with an antioxidant effect, a disinfecting agent, an insecticide, a germicide or a fungicidal effect.

An organic agent comprises, for example, a citric extract, propolis, synthetic waxes or sugars. Wax or a sugar coating, for example, can play an important role to avoid moisture loss, prevent dehydration of the fruit or vegetable, maintain its organoleptic characteristics and maintain a constant weight of the fruit or vegetable during the period of storage and transport. Sugars, for example, can be a preparation obtained from the very fruit to be treated.

Fungicidal compounds such as Fluodioxynil, Fenhexamid, Iprodione and compounds like potassium bicarbonate can also be applied. Scholar® is a broad-spectrum contact fungicide, used for the treatment of stone fruits, pome fruits, citrus, pomegranates and blueberries in post-harvest, before packaging, to control pathogenic fungi that cause diseases or rot that affect the fruit, during storage and/or transport to destination markets.

According to some embodiments, the products can be applied post-harvest with the device, for example, to fruits and also to vegetables such as potatoes, Brussels sprouts, avocados, etc.

A biological agent applied by the device can be, for example, bacteria. For example, *Bacillus subtilis* produces spores and metabolites, and may be pretreated to produce spores. This *Bacillus* may be applied in combination with Scholar, Scholar being a fungicide that is harmless to *Bacillus subtilis*, so both can be applied in a mixture.

*Bacillus subtilis* is also used for application on grapes. The applied *Bacillus subtilis* is generally previously treated to produce spores. The *Bacillus* thus treated is used both for its ability to produce spores and for its ability to produce metabolites.

A special strain of *Bacillus* that is resistant to UV light and anaerobic may be used.

*Bacillus* is competing against fungi. That is to say, when the necessary conditions for the growth of fungi are present, there are also the necessary conditions for the *Bacillus* spores to become bacteria that compete for space and prevent the reproduction of pathogenic fungi for the fruit.

The Bacinpost product includes *Bacillus* plus exudate that has a fungicidal contact effect. Bacinpost is a highly recommended preventive biocontroller for the control of gray rot in table grape, blueberry and tomato crops. Bacinpost comprises a concentrated suspension of vegetative cells, endospores and active secondary metabolites. The native strain of *Bacillus subtilis* C110 quickly colonizes microwounds in the plant thanks to its excellent biological characteristics which allow it to adapt to local environmental conditions and compete effectively for space and nutrients with *Botrytis cinerea*, a fungus that causes gray rot.

In general, Bacifrut is applied in orchards. The Bacinpost product has more secondary metabolites than Bacifrut. For example, Scholar (Fludioxonil) has fungicidal activity by contact and is available as an emulsifiable concentrate for post-harvest application in the treatment of fungal diseases caused by fungi such as *Botrytis* (*Botrytis cinerea*), which attack collected fruits such as cherries, plums and peaches, citrus fruits, apples and pears. The product is applied directly on the fruit by means of a shower ("Drencher" system) or immersion for 30-60 seconds before the fruit enters the chamber. Approximately 4.5 L of solution/ton of fruit is applied.

The electrostatic device, on the other hand, allows reducing the amount of product applied, using 9 ml of product/ton of fruit, for example, which represents a significant economic advantage.

Serenade® is a biological fungicide that can be used in general against foliar and soil diseases in fruit trees and vegetables. Based on spores of the beneficial QST 713 strain of *Bacillus subtilis* bacteria. Serenade® is a fungicide that provides control with high levels of environmental safety, human safety, and safety to non-target organisms, including bees when used as directed. It can be used when other crop protection tools cannot, due to its short pre-harvest interval and the absence of residues. It helps producers meet re-entry intervals, manage worker safety requirements, and meet food chain specifications. It is exempt from the maximum residue limit, is harmless to bees and is compatible in mixture with other phytosanitary and nutritional products.

Copper

Copper can be used for organic agriculture as a fungicide or bactericide thanks to its disinfecting action (it eliminates microorganisms), since it prevents and cures the development of a certain group of fungi that attack plants. One of the main uses of copper oxychloride is its fungicidal activity. Copper oxychloride is a natural product that has a preventive action. Its field of action is quite large as it can be used against a large number of fungi and in different types of crops and it is quite persistent in the plant.

The action stage of copper begins with the germination of fungal spores; hence its action is limited to prevent the appearance of fungal diseases. Its mode of action is simple: various fungi in their initial stages are unable to grow or reproduce when the Cu content is above a certain level (2 or 3 ppm, for example).

As an example, copper sulfate pentahydrate can be applied with the electrostatic device, according to some embodiments. However, copper sulfate pentahydrate cannot be added in mixture with bacilli due to the bactericidal effect of copper.

Ozone Application Example

In one embodiment, the device is used to apply ozone to replace the air directed to the nozzle with ozone and apply a mixture of ozone and water. Ozone is considered a better disinfecting compound than chlorine, with the advantage that it leaves no residue since ozone transforms into oxygen in a few minutes.

Cleaning companies using ozone have emerged due to the increasingly marked innovation in methods for disinfecting and cleaning industries, public establishments, such as schools and hospitals, and even homes. Ozone is a useful tool for disinfecting and cleaning, due to its bactericidal and bacteriostatic effect.

The application of ozone has been used for water treatment since the turn of the century. Today, its use for this purpose extends to the treatment of all kinds of environments, and even the human body.

For ozone application, the device requires an ozone generator as an additional device. The ozone generator is installed in the air line directed to the nozzle and ozone mixed with water is applied. For example, a 20 G generator is used that allows a cold room to be sanitized in 20 minutes, applying 20 liters per minute of a mixture of ozone and water.

Ozone oxidizes the proteins of the virus envelope and modifies their structure, preventing them from anchoring in the host cells, an action that prevents them from reproducing and consequently causes their death. Ozone fights pathogens by oxidative action that causes irreversible damage to fungal cells, eliminating them from all kinds of environments. Ozone is enriched oxygen that comprises three oxygen atoms, is unstable, and breaks down relatively easily into oxygen. Due to this characteristic, ozone is highly efficient as a disinfectant and is the most serious competitor of chlorine.

Ozone is a slightly blue gas with a characteristic odor that can be perceived after thunderstorms. It is poorly soluble in water and very volatile. It stays in the water only a few minutes; in its application, approximately 10% is lost due to volatilization. The doses necessary to disinfect water vary according to the water quality.

Ozone is considered the most efficient microbicidal disinfectant and requires fairly short contact times. The speed with which ozone kills bacteria is considerably greater than that of chlorine, about three thousand times greater, because, although both are oxidants, the mechanism of action is different. Ozone kills the bacteria by disrupting the cell diaphragm. Instead, chlorine must enter the bacterial cell wall and diffuse into the cytoplasm, an action that is highly dependent on contact time.

Technical Characteristics of the Equipment, According to Some Embodiments

The equipment allows working at a voltage: 110-220 volts, a frequency: 50-60 Hz, an air flow rate: 30 liters per min, air pressure: 1-2 atmospheres (15-30 psi)

In some embodiments, the equipment allows the application of non-viscous, non-corrosive products, air, ozone, agricultural products, organic products, and conductive products.

The equipment works at an electrostatic voltage of between 5,000 to 40,000 volts, preferably between 15,000 to 30,000 volts, more preferably at a voltage of 25,000 volts. The pump works at a flow rate of 1 to 400 cm3 per minute.

Equipment Operation Mode

To start the equipment, the following condition should be met:
all switches must be in the off position and the regulating valves must be closed.

To start the equipment, follow the steps listed below:
Connect the equipment to the power outlet;
Connect the equipment to the air intake;

Turn on the equipment (using switch on console);
Place the switch in "Manual Control";
Start the pump (using switch on console);
Adjust the liquid valve until the desired flow rate is set;
Adjust the air valve until the desired atomization rate is set;
Turn the electrostatic power on (using switch on console).

To end the application, follow the steps listed below:
Turn off the electrostatic power;
Turn off the pump;
Turn off the computer;
Turn off the air supply.

By following these steps at the end of the application, the configuration of the air and liquid regulating valves is maintained, so that when restarting the operation of the equipment, it is already calibrated.

To restart the application, follow the steps listed below:
Turn on the equipment;
Start the air supply;
Start the pump;
Turn the electrostatic power on.

REFERENCES

1 Electrostatic device schematic
2 Control console
3 Remote control
4 Pump
5 Tank
6 Nozzle
7 Electrostatic emission antenna
8 High voltage power line
9 Hood
10 Heater power line
11 Nozzle heater
12 Pressure regulator
13 Air flow regulator
14 Additional pressure regulator
15 Compressor
16 Main air line
17 First air line
18 Second air line
19 Second air line restrictor
20 Key
21 Fork
22 First liquid line
23 Second liquid line
24 Liquid return line
25 Line filter
26 Set of restrictors
27 First check valve
28 Second check valve
29 Filter
30 Third liquid line
31 1×F Restrictor
32 2×F Restrictor
33 4×F Restrictor
34 8×F Restrictor
35 Liquid flow regulating system
36 Regulating valve
37 Flow control
38 Flowmeter
39 Tank heater
40 Binary switch system
41 Solenoid valve
42 Nozzle holding tube
43 Nozzle holder
44 Nozzle cap
45 Bolts
46 Anchor plate
47 Heater cover
48 Power line hole
49 Liquid inlet
50 Air inlet
51 Ground cable
52 Internal tube
53 External tube
54 Top hole
55 Bottom side hole
56 High-voltage conductor element tube
57 Dry air
58 Outer surface of the inner tube
59 Upper tube
60 Middle part of the hood
61 Bottom hole
62 Inner wall
63 Outer wall
64 Air chamber
65 Stand
66 Nozzle holder length adjuster
67 Main column
68 Fixation
69 Clamp
70 Folding clamping element
71 Anchorage
72 Anchor hole
73 Recess
74 Slit
75 Flat surface
76 Holding flap

The invention claimed is:

1. An electrostatic device comprising:
an air flow regulator system comprising a pressure regulator and an air flow regulator;
a liquid flow regulating system comprising a set of restrictors;
a tank;
a positive displacement pump;
an electrostatic system comprising an electrostatic emission antenna and an insulating hood of the electrostatic emission antenna; and
an air-liquid nozzle that is separated from the electrostatic emission antenna;
wherein the liquid flow regulating system is configured to deliver a liquid from the tank to the air-liquid nozzle passing the restrictors driven by the positive displacement pump;
wherein the air flow regulator system is configured to deliver air to the air-liquid nozzle and to deliver air to the insulating hood; and
wherein the electrostatic emission antenna is located at a bottom of the insulating hood, and the insulating hood isolates the electrostatic emission antenna from a rest of the components of the device to avoid an electric arc.

2. The device of claim 1, comprising a temperature control system comprising a nozzle heater and a tank heater.

3. The device of claim 1, wherein the liquid flow regulating system comprises a binary switch system, a regulating valve, a flow control, and a flowmeter.

4. The device of claim 3, wherein the liquid flow regulating system comprises a first liquid line coming out of the tank, driven by the pump up to a fork where it separates into: a second liquid line and a return liquid line; wherein the second liquid line comprises the set of restrictors and the binary switch system equipped with solenoid valves that regulate the amount of the liquid that goes to the air-liquid nozzle, and wherein the regulating valve, the flow control and the flowmeter that measures a liquid flow that is returned to the tank are located in the return liquid line.

5. The device of claim 4, wherein the second liquid line, after passing through the set of restrictors, comprises a first check valve that prevents the liquid from returning to the set of restrictors so that the liquid flow directed to the air-liquid nozzle through a third liquid line is kept measured and constant.

6. The device of claim 3, wherein the set of restrictors comprises restrictors having different internal diameters ranging from approximately 0.3 mm to 1 mm.

7. The device of claim 1, wherein the electrostatic system comprises a tube for a high-voltage conductive element that carries a high voltage power line and supports that secure the high-voltage conductive element tube to a horizontal part of a nozzle holding tube.

8. The device of claim 7, wherein the insulating hood comprises an internal tube and an external tube, an upper hole for the entry of the high-voltage conductive element that exits through a lower hole of the internal tube, and a lower lateral hole for entry of dry air that acts as an insulator.

9. The device of claim 8, wherein a hose injects dry air through the lower lateral hole in the form of an air jet that enters between the external tube and the internal tube, wherein the air jet dries an area formed around a central space through which the high-voltage conductive element, that goes to the electrostatic emission antenna, exits; the air prevents the surface around the central space where the high-voltage conductive element exits from getting wet and prevents a formation of an electric arc that can produce an electric spark or a flame that can nullify an effect of an electrostatic field on the device.

10. The device of claim 1, wherein the air-liquid nozzle comprises a liquid inlet that receives a liquid coming from a third liquid line and an air inlet that receives air coming from a first air line; wherein the air-liquid nozzle is housed in a space formed between a nozzle holder and a flat surface of a lower end of a nozzle holding tube; wherein the nozzle holder forms a rectangular frame with an open end, the open end comprises fastening tabs having threaded holes into which bolts are screwed to secure a nozzle cap; wherein the nozzle cap has a flat shape and has two perpendicular surfaces that comprise a recess designed to be inserted into an anchor slit located at the rear of a lower end of the nozzle holding tube.

11. The device of claim 10, wherein the nozzle holder houses a nozzle heater which is supported by a heater cover; wherein the heater cover is made of heat conductive material, has a flat shape and two perpendicular surfaces that comprise an anchoring protrusion; the anchoring protrusion is inserted into an anchor hole of the nozzle holder to hold the nozzle heater in place.

12. The device of claim 10, wherein the rectangular frame of the nozzle holder is closed by an anchor plate by bolts that are inserted into holes located at the ends of the anchor plate; wherein the holes of the anchor plate fit with the threaded holes located in the fastening tabs of the nozzle holder; wherein the bolts pass through the holes in the anchor plate and push the nozzle cap into the anchor slit to hold the nozzle a nozzle heater in place.

13. The device of claim 1, wherein the device comprises a compressor that provides dry air through an air line that branches into two air lines: a first air line that carries air to the air-liquid nozzle, and a second air line that carries air to the insulating hood of the electrostatic emission antenna, and wherein the second air line that carries air to the insulating hood comprises a restrictor that controls an amount of air going to the insulating hood.

14. The device of claim 13, wherein the first air line that carries air to the air-liquid nozzle passes through a control console where it encounters the air flow regulator system comprising the pressure regulator and the air flow regulator, which allows regulating the air flow going to the air-liquid nozzle; wherein the air flow regulator comprises a flowmeter that comprises a small steel ball in a graduated column, where the steel ball is pushed by air supplied by the compressor.

15. The device of claim 1, wherein the tank is made of stainless steel or PVC, has a 5 to 60 liters capacity, and comprises a stirring system including three pumps arranged in a tank base; the tank also includes a temperature control system that allows a product to be kept at a suitable temperature to prevent a liquid from freezing in hoses when a ambient temperature is below 0° C.

16. An electrostatic application method comprising:
providing an air flow to an insulating hood of an electrostatic emission antenna and to an air-liquid nozzle that is separate from the electrostatic emission antenna;
providing a liquid flow from a tank to the air-liquid nozzle by a positive displacement pump;
regulating the air flow by a pressure regulator and an air flow regulator;
regulating the liquid flow that passes through a set of restrictors; and
turning power on that goes to the electrostatic emission antenna;
wherein the electrostatic emission antenna is located at a bottom of the insulating hood and the insulating hood isolates the electrostatic emission antenna from a rest of the components to avoid an electric arc.

17. The electrostatic application method of claim 16, further comprising connecting power of a temperature control system that comprises connecting power of a nozzle heater and connecting power of a tank heater.

18. The electrostatic application method of claim 16, comprising powering a nozzle heater which is supported by a heater cover; wherein the heater cover is made of heat conducting material; wherein the nozzle heater and the heater cover are fitted and are, in turn, secured to a flat surface of the nozzle so that the air-liquid nozzle heater can heat the air-liquid nozzle by contact.

19. The electrostatic application method of claim 16, comprising regulating the liquid flow going to the air-liquid nozzle by a binary switch system comprising solenoid valves that regulate an amount of liquid that passes through the set of restrictors; comprising opening or closing the solenoid valves to regulate the amount of liquid that passes through restritors of the set of restrictors which have different internal diameters ranging from approximately 0.3 mm to 1 mm.

20. The electrostatic application method of claim 16 comprising regulating a liquid the flow in a return line by a regulating valve, a flow control and a flowmeter that measures the liquid flow that is returned to the tank; wherein the liquid flow in the return line is greater, approximately 2 liters per minute, which allows to an amount of return liquid to be accurately measured and allows the contents of the tank to be stirred with the return liquid.

21. The electrostatic application method of claim 16 comprising providing a dry air flow going to the insulating hood of the electrostatic emission antenna, which comprises forming an air jet between an external tube and an internal tube of the insulating hood, that dries an area formed around a central space through which a high-voltage conductive element, that goes to the electrostatic emission antenna, exits; the air jet prevents a surface around the central space where the high voltage conductive element exits from getting wet and prevents a formation of an electric arc that can produce an electric spark or a flame that can nullify an effect of the electrostatic field of an electrostatic application method.

22. The electrostatic application method of claim 16, wherein the air flow regulator comprises a flowmeter provided with a steel ball in a graduated column, where the steel ball is pushed by air that is supplied by a compressor; wherein dry air exits from the compressor through an air line that branches into two air lines: a first air line that carries air to the air-liquid nozzle, and a second air line that carries air to the insulating hood of the electrostatic emission antenna.

23. The electrostatic application method of claim 22 comprising regulating pressure of the first air line that carries air to the air-liquid nozzle by the pressure regulator and the air flow regulator on a control console; wherein regulating an air flow allows a droplet size coming out of the nozzle to be regulated, where the droplet size is inversely proportional to an applied air flow.

\* \* \* \* \*